United States Patent
Loomis et al.

(10) Patent No.: US 9,140,968 B2
(45) Date of Patent: Sep. 22, 2015

(54) PROJECTION DEVICE PARTICLE-CONTAINMENT SHIELD

(75) Inventors: Dan Loomis, Portland, OR (US); Brian Patterson, Portland, OR (US)

(73) Assignee: SEIKO EPSON CORPORATION, Suwa-shi (JP)

( * ) Notice: Subject to any disclaimer, the term of this patent is extended or adjusted under 35 U.S.C. 154(b) by 1265 days.

(21) Appl. No.: 12/163,656

(22) Filed: Jun. 27, 2008

(65) Prior Publication Data
US 2009/0059181 A1 Mar. 5, 2009

Related U.S. Application Data

(60) Provisional application No. 60/937,761, filed on Jun. 29, 2007.

(51) Int. Cl.
*G03B 21/16* (2006.01)
*G03B 21/20* (2006.01)

(52) U.S. Cl.
CPC .............. *G03B 21/16* (2013.01); *G03B 21/202* (2013.01); *G03B 21/2026* (2013.01)

(58) Field of Classification Search
CPC ... G03B 21/16; G03B 21/202; G03B 21/2026
USPC .............. 353/56, 57, 58, 59, 60, 61, 119, 122
See application file for complete search history.

(56) References Cited

U.S. PATENT DOCUMENTS

| | | | | |
|---|---|---|---|---|
| 6,398,366 B1 * | 6/2002 | Hara et al. | ...... | 353/57 |
| 6,494,581 B2 * | 12/2002 | Shimizu | ...... | 353/61 |
| 6,509,674 B1 * | 1/2003 | Nakagawa | ...... | 313/113 |
| 6,698,899 B2 * | 3/2004 | Yamada et al. | ...... | 353/61 |
| 6,709,112 B2 * | 3/2004 | Miyamoto et al. | ...... | 353/57 |
| 6,902,275 B2 * | 6/2005 | Yamada et al. | ...... | 353/61 |
| 6,966,654 B2 * | 11/2005 | Ozawa et al. | ...... | 353/61 |
| 7,147,349 B2 * | 12/2006 | Kato et al. | ...... | 362/294 |
| 7,188,973 B2 * | 3/2007 | Katsuma | ...... | 362/293 |
| 7,237,906 B2 * | 7/2007 | Morimoto et al. | ...... | 353/61 |
| 7,293,878 B2 * | 11/2007 | Morita et al. | ...... | 353/57 |
| 7,472,996 B2 * | 1/2009 | Suzuki | ...... | 353/60 |
| 7,484,853 B2 * | 2/2009 | Nishida et al. | ...... | 353/99 |
| 7,506,986 B2 * | 3/2009 | Koba et al. | ...... | 353/119 |
| 7,510,285 B2 * | 3/2009 | Takemi et al. | ...... | 353/61 |
| 7,591,571 B2 * | 9/2009 | Takeda | ...... | 362/373 |
| 7,594,739 B2 * | 9/2009 | Taguchi et al. | ...... | 362/373 |
| 7,607,781 B2 * | 10/2009 | Yun et al. | ...... | 353/55 |
| 7,621,645 B2 * | 11/2009 | Nakagawa et al. | ...... | 353/61 |
| 7,963,659 B2 * | 6/2011 | Suzuki | ...... | 353/61 |

(Continued)

*Primary Examiner* — Bao-Luan Le
(74) *Attorney, Agent, or Firm* — Oliff PLC (57) ABSTRACT

A particle-containment shield is provided. The particles-containment shield includes a containment structure that defines an air inlet to receive air heated by a projection lamp from the outlet of the projection-lamp module and defines an air outlet to vent air heated by the projection lamp away from the projection lamp. The containment structure is sealed intermediate the air inlet and the air outlet such that air heated by the projection lamp that enters through the air inlet exits the containment structure through the air outlet. The containment structure defines a length, a width, and a height of the particle-containment shield. The particle-containment shield includes one or more deflection members is arranged in the containment structure to collectively block all straight line paths from the air inlet to the air outlet so as to inhibit projection lamp particles from exiting the air outlet upon projection lamp rupture.

18 Claims, 6 Drawing Sheets

(56) References Cited

U.S. PATENT DOCUMENTS

| | | | |
|---|---|---|---|
| 2001/0021006 A1* | 9/2001 | Shimizu | 353/57 |
| 2002/0039174 A1* | 4/2002 | Yamada et al. | 353/31 |
| 2002/0064046 A1* | 5/2002 | Davis et al. | 362/298 |
| 2003/0071977 A1* | 4/2003 | Miyamoto et al. | 353/52 |
| 2004/0114113 A1* | 6/2004 | Yamada et al. | 353/61 |
| 2004/0169825 A1* | 9/2004 | Ozawa et al. | 353/61 |
| 2004/0228130 A1* | 11/2004 | Kato et al. | 362/294 |
| 2004/0263799 A1* | 12/2004 | Lim | 353/61 |
| 2005/0162618 A1* | 7/2005 | Morita et al. | 353/57 |
| 2006/0109656 A1* | 5/2006 | Takeda | 362/294 |
| 2006/0170876 A1* | 8/2006 | Takemi et al. | 353/61 |
| 2006/0209544 A1* | 9/2006 | Nishikawa et al. | 362/294 |
| 2006/0256296 A1* | 11/2006 | Yun et al. | 353/55 |
| 2006/0274530 A1* | 12/2006 | Lin et al. | 362/294 |
| 2007/0024817 A1* | 2/2007 | Nakagawa et al. | 353/57 |
| 2007/0216874 A1* | 9/2007 | Suzuki | 353/57 |
| 2007/0296927 A1* | 12/2007 | Chang et al. | 353/52 |
| 2010/0033688 A1* | 2/2010 | Obama et al. | 353/61 |

* cited by examiner

PROJECTION DEVICE PARTICLE-CONTAINMENT SHIELD

CROSS REFERENCE TO RELATED APPLICATION

This application claims the benefit of U.S. Provisional Application 60/937,761, filed on Jun. 29, 2007, entitled PARTICLE CONTAINMENT BAFFLES, the entirety of which is hereby incorporated herein by reference for all purposes.

BACKGROUND

During projection device operation, a projection lamp may generate a substantial amount of heat that potentially may interfere with operation of the projection device and may be hazardous to the projection device. Accordingly, a projection device may include cooling channels that are directed from the projection lamp to the exterior of the projection device. Further, the projection device may include a cooling fan or blower to drive heat away from the projection lamp, directed through the cooling channels, and out of the projection device in order to lower the temperature of the projection device and more particularly to cool the projection lamp.

For any number of reasons, the projection lamp may fail during operation of the projection device. In some cases, the projection lamp may rupture causing particles of the projection lamp to be propelled into the cooling channels and out of the projection device. Various attempts have been made to reduce the amount of particles exiting the projection device in the event of such a rupture. In one example, the cooling channels of the projection device may be fitted with a mesh screen to catch the projection lamp particles.

However, some mesh screen configurations may include gaps between the connected material of the screen that may only retain larger particles and may not inhibit smaller particles from exiting the projection device. Moreover, if the mesh screen is configured with smaller gaps between the connected material of the screen air flow may be impeded which may raise the interior temperature of the projection device and may create a backpressure to the projection lamp that may negatively affect the operating conditions of the projection device.

SUMMARY

In one approach, a particle-containment shield is utilized to contain lamp particles within a projection device. In one example, a particle-containment shield is configured to be connected to an outlet of a projection-lamp module of a projection device to inhibit projection lamp particles from exiting the projection device upon projection lamp rupture. The particle-containment shield comprises a containment structure that defines an air inlet to receive air heated by a projection lamp from the outlet of the projection-lamp module and defines an air outlet to vent air heated by the projection lamp away from the projection lamp. The containment structure is sealed intermediate the air inlet and the air outlet such that air heated by the projection lamp that enters through the air inlet exits the containment structure through the air outlet. The containment structure defines a length, a width, and a height of the particle-containment shield. The particle-containment shield includes one or more deflection members arranged in the containment structure to collectively block all straight line paths from the air inlet to the air outlet so as to inhibit projection lamp particles from exiting the air outlet upon projection lamp rupture.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIGS. 43, 44, 45, 46, and 47 respectively depict front-perspective, top, front, right-side, and cross-sectional views of a width-aligned serpentine air-flow path particle-containment shield for use with the projection lamp module of FIG. 2.

DETAILED DESCRIPTION

The particle-containment shield described herein may provide improved retention of projection lamp particles within the projection device upon projection lamp failure. In particular, the particle-containment shield may include differently oriented deflection members that may impede the progress of particles propelled away from the projection lamp when the projection lamp ruptures. Furthermore, the particle-containment shield may be configured to facilitate suitable airflow to regulate the interior temperature of the projection device, air-flow within the projection device, and other operating conditions.

Figure 1:
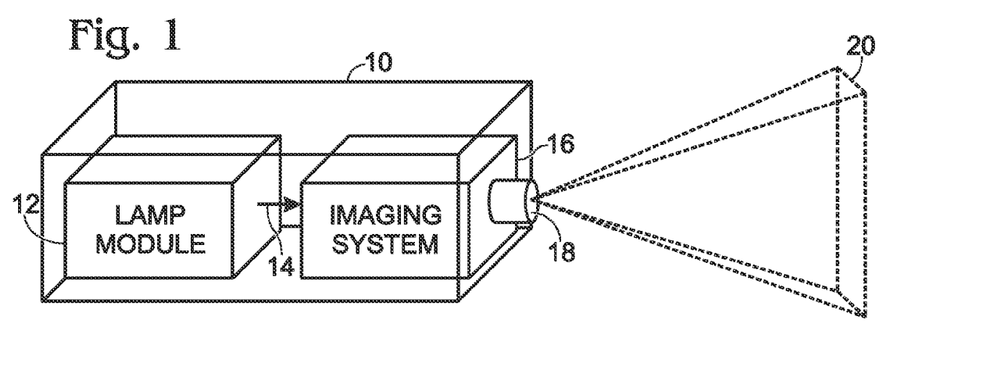
FIG. 1 shows a schematic depiction of an example projection device.

FIG. 1 schematically shows an example projection device 10. Projection device 10 is a front-projection device that may be configured to project imagery onto a remote projection screen 20. In particular, projection device 10 includes a projection lamp module 12 that is configured to generate light 14. Light 14 is directed to an imaging system 16 that is configured to utilize light 14 to generate an image to be projected from projection device 10. Imaging system 16 may include virtually any suitable image-generating technology, such as liquid crystal display (LCD) technology, digital light processing (DLP) technology, liquid crystal on silicon (LCOS) technology, etc. Imaging system 16 is configured to direct a generated image through lens 18 for projection onto remote screen 20.

Figure 2:
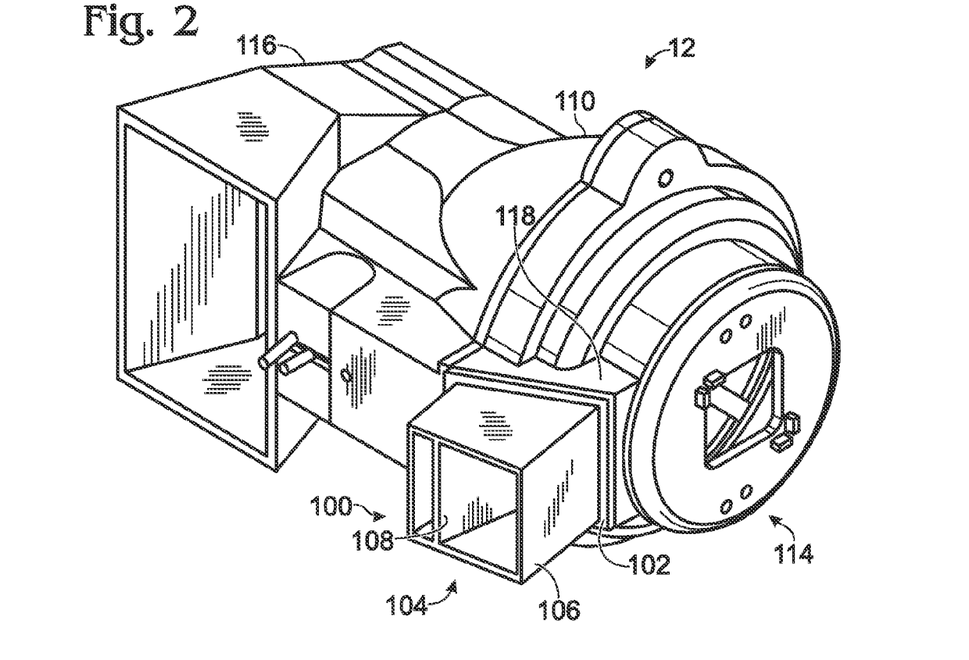
FIG. 2 shows a schematic depiction of an example projection lamp module that may be installed in the projection device of FIG. 1.

FIG. 2 shows an exemplary embodiment of a projection lamp module 12 for use in a projection device, such as projection device 10 of FIG. 1. Projection lamp module 12 includes projection lamp 110 that is configured to create light that is directed through orifice 114 to imaging system 116 of FIG. 1 which manipulates light 14 to create an image for projection.

Projection lamp module 12 includes a blower (or cooling fan) 116 which forces heat generated during operation of projection lamp 110 into cooling channel 118. Cooling channel 118 directs the hot air away from projection lamp 110 to the outside of projection lamp module 12 in order to cool projection lamp module 12. A particle-containment shield 100 is configured to be connected to an outlet of cooling channel 118 to inhibit projection lamp particles from exiting the projection device upon projection lamp rupture. Particle-containment shield 100 includes an air inlet 102 to receive air heated by projection lamp 110 from the outlet of cooling channel 118. Particle-containment shield 100 includes an air outlet 104 to vent air heated by projection lamp 110 away from the projection lamp module 12. A containment structure 106 defines air inlet 102 and air outlet 104 and is intermediate air inlet 102 and air outlet 104 to contain air heated by projection lamp 110 such that air that enters air inlet 102 travels to air outlet 104. In other words, containment structure 106 is air-tight or sealed between air inlet 102 and air outlet 104. Further, particle-containment shield 100 includes one or more deflection members 108 positioned to collectively block all straight line paths from air inlet 102 to air outlet 104. In certain settings, positioning deflection members to collectively block all straight line paths from the air inlet to the air outlet will inhibit projection lamp particles from exiting the air outlet upon projection lamp rupture.

In the illustrated embodiment, particle-containment shield 100 is depicted as an attachment connected to the end portion of cooling channel 118, however it should be appreciated that cooling channel 118 may be manufactured such that particle-containment shield 100 is integral with cooling channel 118.

Figure 3:
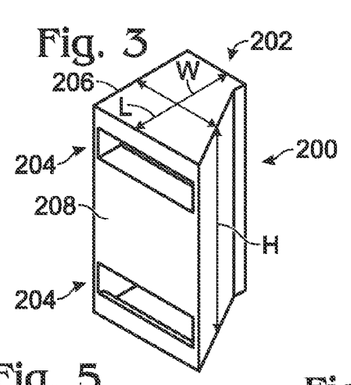
FIGS. 3, 4, 5, 6, and 7, respectively depict front-perspective, top, front, right-side, and cross-sectional views of a height-aligned chevron particle-containment shield for use with the projection lamp module of FIG. 2.

FIGS. 3-7 show schematic representations of an example embodiment of a particle-containment shield 200. Particle-containment shield 200 includes a plurality of deflection members that collectively form a chevron configuration aligned with the height of particle-containment shield 200. FIG. 3 shows a front perspective view of particle-containment shield 200. Particle-containment shield 200 may include an air inlet 202 and air outlets 204 which are defined by a containment structure 206 intermediate air inlet 202 and air outlets 204. Containment structure 206 contains air that passes through air inlet 202 so that it travels to air outlets 204. In other words, containment structure 206 is "air-tight" between air inlet 202 and air outlets 204. Containment structure 206 defines a length "L", a width "W", and a height "H" of particle-containment shield 200.

Figure 4:
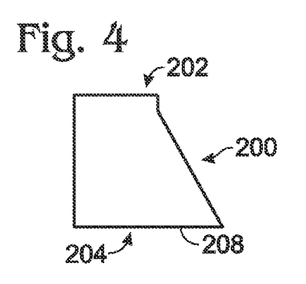

FIG. 4 shows a top view of particle-containment shield 200. The width (and height) of air inlet 202 are configured to connect to an outlet of cooling channel 118 (see FIG. 2) so that air may easily flow to particle-containment shield 200 with little resistance. Air outlets 204 and exterior wall 208 collectively form dimensions that are larger than air inlet 202 to facilitate increased air flow through particle-containment shield 200. The increased dimensions of air outlets 204 and exterior wall 208 of particle-containment shield 200 increases the capacity to collect and retain lamp particles upon lamp rupture of particle containment shield 200.

Figure 5:
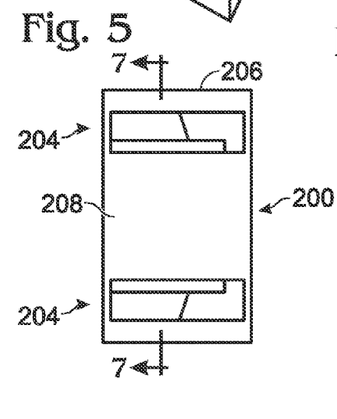

FIG. 5 shows a front view of particle-containment shield 200. An exterior wall 208 of containment structure 206 defines two air outlets 204. In particular, air outlets 204 are spaced apart along the height of containment structure 206 by exterior wall 208 and air outlets 204 span substantially the entire width of exterior wall 208. Further, exterior wall 208 extends a majority of the height of containment structure 206 such that air outlets 204 are less than a majority of the height of containment structure 206. By having two smaller air outlets as opposed to one larger air outlet, larger particles may be impeded from exiting the particle-containment shield while still maintaining an air-flow path through the containment structure that is large enough to not substantially impede air-flow exiting the projection lamp module.

Figure 6:
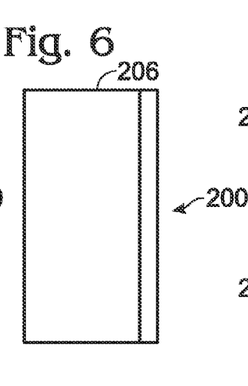
Figure 7:
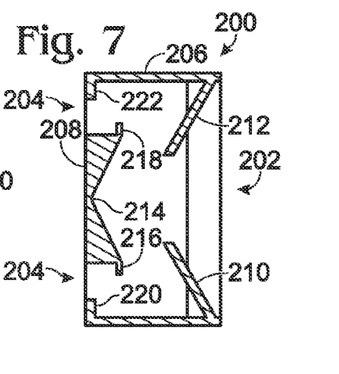

FIG. 6 shows a right-side view of particle-containment shield 200. Particle-containment shield 200 has a substantially rectangular profile. FIG. 7 shows a cross-section view of particle-containment shield 200 made along line "7-7" of FIG. 5. Particle-containment shield 200 includes a plurality of deflection members that collectively form a chevron configuration aligned with the height of particle-containment shield 200. In particular, lower-interior wall 210 extends obliquely from an interior floor surface of containment structure 206 in the direction of exterior wall 208 and upper-interior wall 212 extends obliquely from an interior ceiling surface of containment structure 206 in the direction of exterior wall 208. Lower-interior wall 210 and upper-interior wall 212 are positioned to interfere with at least some particles entering air inlet 202 in order to reduce the traveling speed of the lamp particles. Further, lower-interior wall 210 and upper-interior wall 212 may cooperatively funnel intake air and/or lamp particles to a chevron portion 214 formed on an interior surface of exterior wall 208. The chevron portion 214 includes two angled segments or surfaces that meet at a point in the direction of air outlets 204. The segments of chevron portion 214 are angled such that the length of chevron section 214 is aligned with the height of containment structure 206. Due to the orientation of chevron portion 214, lamp particles that contact chevron portion 214 may be directed back toward a backside surface of lower-interior wall 210 or upper-interior wall 212 to further reduce the travel force of the lamp particles. Lower-interior ridge 216 and lower-exterior ridge 220 cooperate to impede lamp particles from exiting the lower air outlet of air outlets 204. Similarly, upper-interior ridge 218 and upper-exterior ridge 222 cooperate to impede lamp particles from exiting the upper air outlet of air outlets 204.

In the illustrated embodiment, it will be appreciated that at least one of the deflection members spans substantially the entire interior width of containment structure 206. In some cases, all of the deflection members may span substantially the entire interior width of containment structure 206. Further, it will be appreciated that, in some cases, the walls of the containment structure may be characterized as deflection members. For example, if a wall of a containment structure protrudes into the interior of the containment structure to impede a straight-line path from the input to the output, that wall is considered a deflection member.

Figure 8:
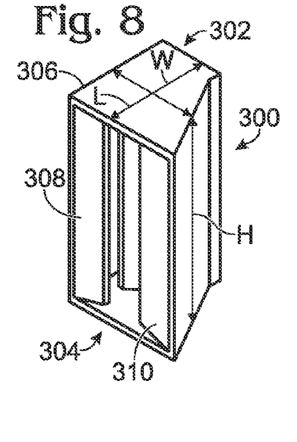
FIGS. 8, 9, 10, 11, and 12 respectively depict front-perspective, top, front, right-side, and cross-sectional views of a width-aligned chevron particle containment shield for use with the projection lamp module of FIG. 2.

FIGS. 8-12 show schematic representations of another example embodiment of a particle-containment shield 300. Particle-containment shield 300 includes a plurality of deflection members that collectively form a chevron configuration aligned with the width of particle-containment shield 300. FIG. 8 shows a front perspective view of particle-containment shield 300. Particle-containment shield 300 includes an air inlet 302 and an air outlet 304 which are defined by a containment structure 306 intermediate air inlet 302 and air outlet 304. Containment structure 306 contains air that passes through air inlet 302 so that it travels to air outlet 304. In other words, containment structure 306 is "air-tight" between air inlet 302 and air outlet 304. Containment structure 306 defines a length "L", a width "W", and a height "H" of particle-containment shield 300.

Figure 9:
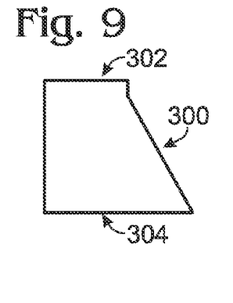

FIG. 9 shows a top view of particle-containment shield 300. The width (and height) of air inlet 302 are configured to connect to an outlet of cooling channel 118 (see FIG. 2) so that air may easily flow to particle-containment shield 300 with little resistance. Air outlet 304 in combination with a left-side exterior wall 308 and a right-side exterior wall 310 form dimensions that are larger than air inlet 302 to facilitate increased air flow through particle-containment shield 300. The increased dimensions of particle-containment shield 300 create an increased capacity to collect and retain lamp particles upon lamp rupture.

Figure 10:
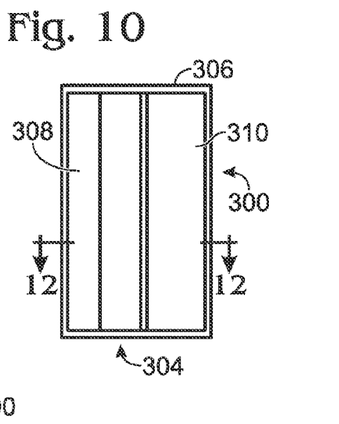

FIG. 10 shows a front view of particle-containment shield 300. Left-side exterior wall 308 and right-side exterior wall span the height of containment structure 306 to cooperatively define air outlet 304. Air outlet 304 extends substantially the entire height of containment structure 306 and is positioned proximate to a centerline bisected along the length of particle-containment shield 300.

Figure 11:
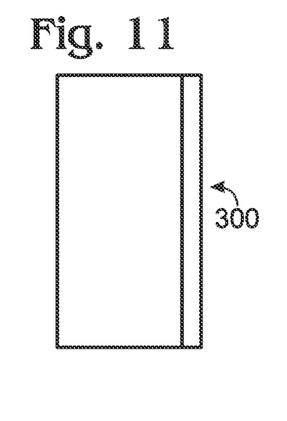
Figure 12:
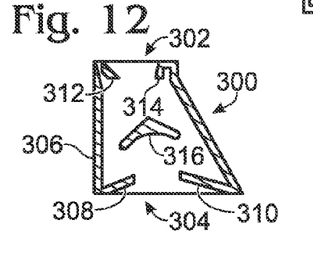

FIG. 11 shows a right-side view of particle-containment shield 300. Particle-containment shield 300 has a substantially rectangular profile. FIG. 12 shows a cross-section view of particle-containment shield 300 made along line "12-12" of FIG. 9. Particle-containment shield 300 includes a plurality of deflection members that collectively form a chevron configuration aligned with the width of particle-containment shield 300. In particular, left-side interior wall 312 extends obliquely from a left-side interior surface of containment structure 306 in the direction of right-side exterior wall 310. Correspondingly, right-side interior wall 314 extends obliquely from an interior right-side surface of containment structure 306 in the direction of left-side exterior wall 308. Left-side interior wall 312 and right-side interior wall 314 are positioned to interfere with at least some particles entering air inlet 302 in order to reduce the traveling speed of the lamp particles. Further, left-side interior wall 312 and right-side interior wall 314 cooperatively funnel intake air and/or particles to a chevron portion 316.

Left-side exterior wall 308 extends obliquely from the left-side interior surface of containment structure 306 toward right-side interior wall 314 and right-side exterior wall 310 extends obliquely from the right-side interior surface of containment structure 306 toward left-side interior wall 312. Due to the oblique orientation of each of left-side exterior wall 308 and right-side exterior wall 310, an interior corner may be created by each of the exterior walls. A chevron portion 316 includes two angled segments that meet at a point in the direction of air inlet 302. The segments of chevron portion 316 are angled such that the length of chevron section 316 is aligned with the width of containment structure 306. Chevron portion 316 is oriented to point toward air inlet 302. As such lamp particles that deflect off of chevron portion 316 may be directed to the interior corner created by left-side exterior wall 308 or the interior corner created by right-side exterior wall 310. Due to the oblique orientation of the exterior walls, the interior corners created by the exterior walls are shaped to have acute angles which increase the likelihood of retaining lamp particles, thus inhibiting the lamp particles from exiting particle-containment shield 300.

It will be appreciated that at least one of the deflection members span substantially the entire interior height of containment structure 306. In some cases, all of the deflection members span substantially the entire interior height of containment structure 306. Further, it will be appreciated that, in some cases, the walls of the containment structure may be characterized as deflection members.

Figure 13:
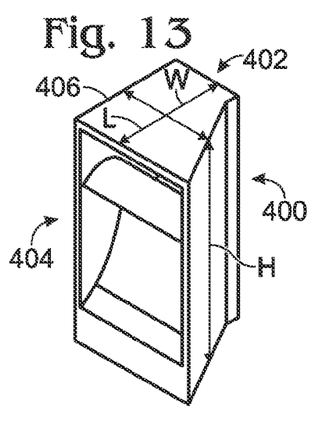
FIGS. 13, 14, 15, 16, and 17 respectively depict front-perspective, top, front, right-side, and cross-sectional views of a wave particle-containment shield for use with the projection lamp module of FIG. 2.

FIGS. 13-17 show schematic representations of another example embodiment of a particle-containment shield 400. Particle-containment shield 400 includes a plurality of deflection members that collectively form a wave (or scoop) configuration. FIG. 13 shows a front perspective view of particle-containment shield 400. Particle-containment shield 400 includes an air inlet 402 and an air outlet 404 which are defined by a containment structure 406 intermediate air inlet 402 and air outlet 404. Containment structure 406 contains air that passes through air inlet 402 so that it travels to air outlet 404. In other words, containment structure 406 is "air-tight" between air inlet 402 and air outlet 404. Containment structure 406 defines a length "L", a width "W", and a height "H" of particle-containment shield 400.

Figure 14:
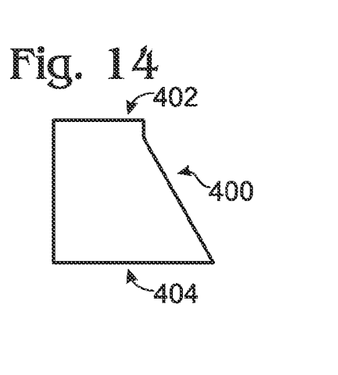

FIG. 14 shows a top view of particle-containment shield 400. The width (and height) of air inlet 402 are configured to connect to an outlet of cooling channel 118 (see FIG. 2) so that air may easily flow to particle-containment shield 400 with little resistance. Air outlet 404 is larger than air inlet 402 to facilitate increased air flow through particle-containment shield 400. The increased size of air outlet 404 increases the dimensions of particle-containment shield 400 so that particle-containment shield 400 has an increased capacity to collect and retain lamp particles upon lamp rupture.

Figure 15:
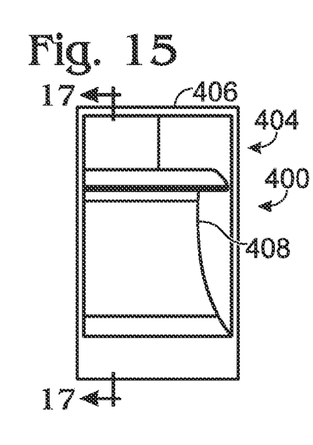

FIG. 15 shows a front view of particle-containment shield 400. An exterior wall 408 spans a majority of the height of containment structure 406 to define a lower edge of air outlet 404. Air outlet 404 extends substantially the entire width of containment structure 406.

Figure 16:
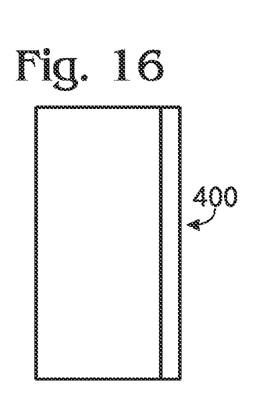
Figure 17:
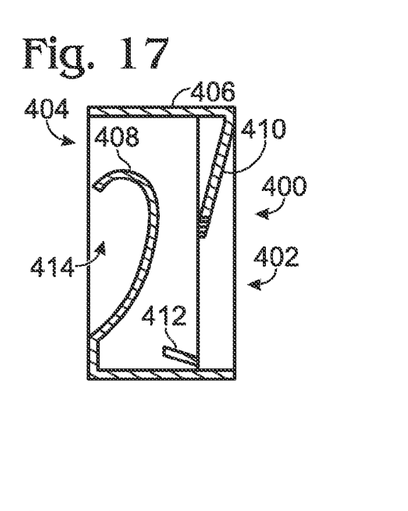

FIG. 16 shows a right-side view of particle-containment shield 400. Particle-containment shield 400 has a substantially rectangular profile. FIG. 17 shows a cross-section view of particle-containment shield 400 made along line "17-17" of FIG. 15. Particle-containment shield 400 includes a plurality of deflection members that collectively form a wave (or scoop) configuration. In particular, upper-interior wall 410 obliquely extends from an interior ceiling surface toward an interior floor surface of containment structure 406. Lower-interior wall 412 obliquely extends from the interior floor surface toward exterior wall 408. Upper-interior wall 410 and lower-interior wall 412 collectively funnel air and/or lamp particles toward an interior corner created by exterior wall 408. Exterior wall 408 includes a section 414 that protrudes into containment section 406 in the direction of air inlet 402. Section 414 is rounded so that exterior wall 408 forms a wave (or scoop) shape. The rounded protrusion (i.e. section 414) of exterior wall 408 cooperates with lower-interior wall 412 to contain lamp particles in the interior corner created by exterior wall 208. Furthermore, section 414 cooperates with upper-interior wall 410 to narrow access to air outlet in order to inhibit lamp particles from exiting particle-containment shield 400.

It will be appreciated that at least one of the deflection members spans substantially the entire interior width of containment structure 406. In some cases, all of the deflection members span substantially the entire interior width of containment structure 406. Further, it will be appreciated that, in some cases, the walls of the containment structure may be characterized as deflection members.

Figure 18:
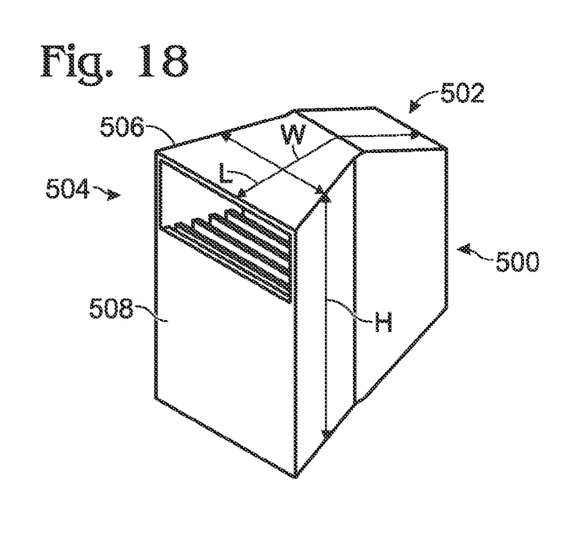
FIGS. 18, 19, 20, 21, and 22 respectively depict front-perspective, top, front, right-side, and cross-sectional views of a laminator particle-containment shield for use with the projection lamp module of FIG. 2.

FIGS. 18-22 show schematic representations of another example embodiment of a particle-containment shield 500. Particle-containment shield 500 includes a plurality of deflection members that collectively form a laminator configuration. FIG. 18 shows a front perspective view of particle-containment shield 500. Particle-containment shield 500 includes an air inlet 502 and an air outlet 504 which are defined by a containment structure 506 intermediate air inlet 502 and air outlet 504. Containment structure 506 contains air that passes through air inlet 502 so that it travels to air outlet 504. In other words, containment structure 506 is "air-tight" between air inlet 502 and air outlet 504. Containment structure 506 defines a length "L", a width "W", and a height "H" of particle-containment shield 500.

Figure 19:
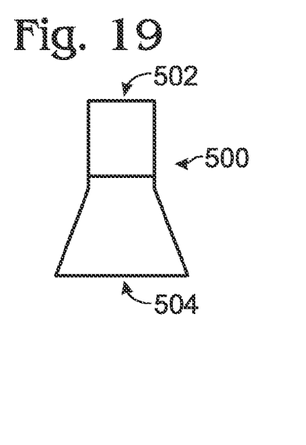

FIG. 19 shows a top view of particle-containment shield 500. The width (and height) of air inlet 502 are configured to connect to an outlet of cooling channel 118 (see FIG. 2) so that air may easily flows to particle-containment shield 500 with little resistance. Air outlet 504 is larger than air inlet 502 to facilitate increased air flow through particle-containment shield 500. The increased size of air outlet 504 increases the dimensions of particle-containment shield 500 so that particle-containment shield 500 has an increased capacity to collect and retain lamp particles upon lamp rupture.

Figure 20:
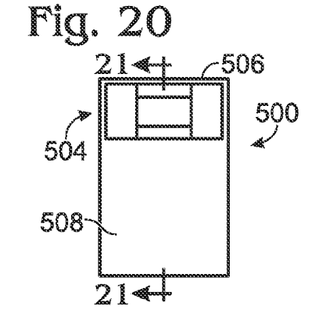

FIG. 20 shows a front view of particle-containment shield 500. An exterior wall 508 spans a majority of the height of containment structure 506 to define a lower edge of air outlet 504. Air outlet 504 extends substantially the entire width of containment structure 506.

Figure 21:
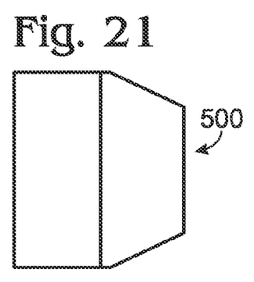
Figure 22:
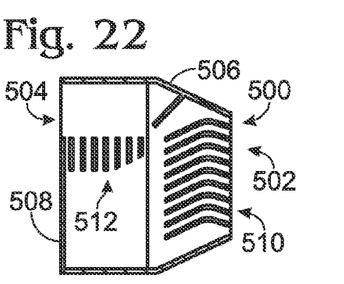

FIG. 21 shows a right-side view of particle-containment shield 500. The height of particle-containment shield 500 expands as it transitions from air inlet 502 to air outlet 504. In particular, particle-containment shield 500 includes a trapezoidal portion that includes air inlet 502 which increases in height and transitions to a rectangular portion that includes air outlet 504. FIG. 22 shows a cross-section view of particle-containment shield 500 made along line "21-21" of FIG. 20. Particle-containment shield 500 includes a plurality of deflection members that collectively form a laminator configuration. In particular, a plurality of chevron-shaped segments 510 are positioned proximate to air inlet 502 and spaced apart along the height of the trapezoidal portion of containment structure 506. Each of the plurality of chevron-shaped segments 510 extend substantially the entire interior width of containment structure 506 and are aligned along the length of containment structure 506. The plurality of chevron-shaped segments 510 are oriented such the point of each segment points toward an interior ceiling surface of containment structure 506 and the length of each chevron-shaped segment is aligned with the length of containment structure 506. The plurality of chevron-shaped segments 510 collectively act as an entry filter to particle-containment shield 500, in that large lamp particles are blocked from entering particle-containment shield 500 by the plurality of chevron-shaped segments 510 while still permitting air to flow through. Further, the air—outlet-side of each of the chevron-shaped segments angles downward, so lamp particles that are small enough to enter through the plurality of chevron-shaped segments 510 are directed to a lower-interior corner created by exterior wall 508.

Furthermore, a plurality of straight segments 512 is positioned proximate to air outlet 504. Each of the plurality of straight segments 512 is aligned with the height of containment structure 506 and expand substantially the entire interior width of containment structure 506. The plurality of straight segments 512 are spaced apart along the length of the rectangular portion of containment structure 506. The plurality of straight segments 512 collectively act as an exit filter to particle-containment shield 500, in that lamp particles that collect in the interior of containment structure 506 are inhibited from reaching air outlet 504 while air is still permitted to flow to air outlet 504.

It will be appreciated that in some embodiments the plurality of chevron-shaped segments 510 and the plurality of straight segments 512 may be equally spaced apart or spaced at varying intervals in order to improve the filtering of particles without impeding airflow. As an example, in the illustrated embodiment, the segments are equally spaced at an interval of 20.0 millimeters.

Figures 23, 25, 26:
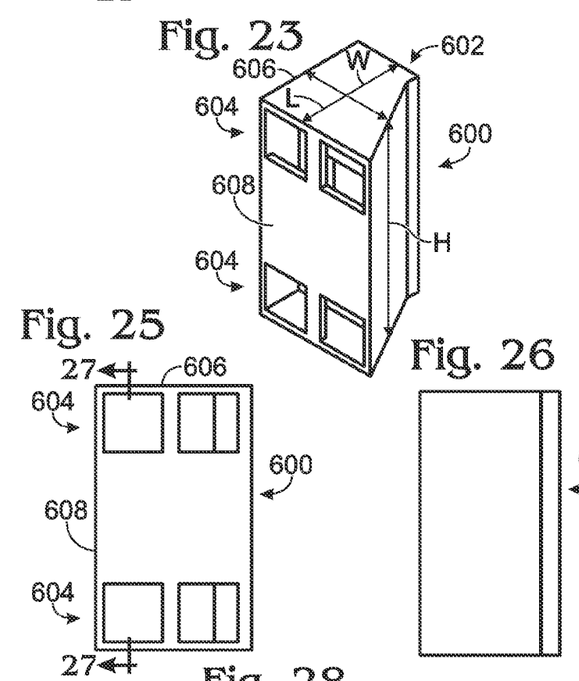
FIGS. 23, 24, 25, 26, and 27 respectively depict front-perspective, top, front, right-side, and cross-sectional views of a window particle-containment shield for use with the projection lamp module of FIG. 2.

FIGS. 23-27 show schematic representations of another example embodiment of a particle-containment shield 600. Particle-containment shield 600 includes a plurality of deflection member that collectively form a window configuration. FIG. 23 shows a front perspective view of particle-containment shield 600. Particle-containment shield 600 includes an air inlet 602 and four air outlets 604 which are defined by a containment structure 606 intermediate air inlet 602 and air outlets 604. Containment structure 606 contains air that passes through air inlet 602 so that it travels to air outlets 604. In other words, containment structure 606 is "air-tight" between air inlet 602 and air outlets 604. Containment structure 606 defines a length "L", a width "W", and a height "H" of particle-containment shield 600.

Figure 24:
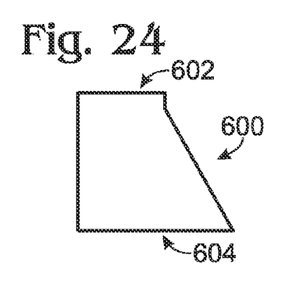

FIG. 24 shows a top view of particle-containment shield 600. The width (and height) of air inlet 602 is configured to connect to an outlet of cooling channel 118 (see FIG. 2) so that air may easily flow to particle-containment shield 600 with little resistance. Collectively, each pair of air outlets 604 and exterior wall 608 is larger than air inlet 602 to facilitate increased air flow through particle-containment shield 600. The increased dimensions may increase the capacity of particle-containment shield 600 to collect and retain lamp particles upon lamp rupture.

FIG. 25 shows a front view of particle-containment shield 600. An exterior wall 608 spans a majority of the height of containment structure 606 to define four windows positioned in each of the four corners of exterior wall 608 that forms air outlets 604.

Figure 27:
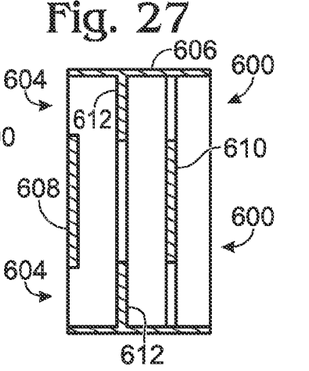

FIG. 26 shows a right-side view of particle-containment shield 600. Particle-containment shield 600 has a substantially rectangular profile. FIG. 27 shows a cross-section view of particle-containment shield 600 made along line "27-27" of FIG. 25. Particle-containment shield 600 includes a plurality of deflection members that collectively form a window configuration. In particular, interior wall 610 is positioned proximate to air inlet 602, is aligned with the height of containment structure 606 so that it is perpendicular relative to an interior ceiling or floor surface of containment structure 606, and spans substantially the entire interior width of containment structure 606. Interior segment 610 spans only some of the interior height of containment structure 606 and is positioned to be substantially aligned with a centerline that bisects the length of containment structure. Interior wall 610 defines an upper passage and a lower passage in which air and particles may pass through.

Intermediate walls 612 are aligned with the height of containment structure 606 so that they are perpendicular relative to the interior ceiling or floor surface of containment structure 606, and span substantially the entire interior width of containment structure 606. Intermediate walls 612 are sized and positioned to at least match the size and position of the upper and lower passages defined by interior wall 610. Intermediate walls 612 further inhibit lamp particles that pass interior wall 610 and may direct lamp particles that do pass interior wall 610 to the center of the interior of containment structure 606.

Exterior wall 608 is substantially the same size and has substantially the same vertical position as interior wall 610 which matches the passage formed by intermediate walls 612. Air outlets 604 are sized to match the height of intermediate walls 612 so that lamp particles do not pass directly through particle-containment shield 600. The window configuration of particle-containment shield 600 form upper and lower serpentine air-flow paths oriented such that corners of the serpentine air-flow path are aligned with the interior width of containment structure 606. The alternately positioned walls of the serpentine air-flow paths may direct lamp particles back and forth down the path. Upon contacting each wall, the exit force of a lamp particle may be repeatedly reduced to inhibit the lamp particles from exiting the particle-containment shield.

Figure 28:
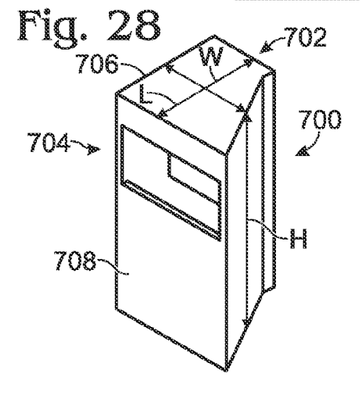
FIGS. 28, 29, 30, 31, and 32 respectively depict front-perspective, top, front, right-side, and cross-sectional views of a height-aligned particle-containment shield for use with the projection lamp module of FIG. 2.
Figure 29:
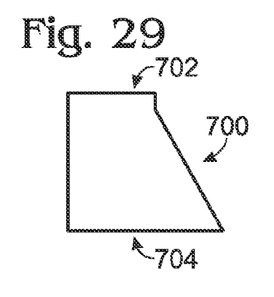

FIGS. 28-32 show schematic representations of another example embodiment of a particle-containment shield 700. Particle-containment shield 700 includes a plurality of deflection members that collectively form a height-aligned configuration. FIG. 28 shows a front perspective view of particle-containment shield 700. Particle-containment shield 700 includes an air inlet 702 and an air outlet 704 which are defined by a containment structure 706 intermediate air inlet 702 and air outlet 704. Containment structure 706 contains air that passes through air inlet 702 so that it travels to air outlet 704. In other words, containment structure 706 is "air-tight" between air inlet 702 and air outlet 704. Containment structure 706 defines a length "L", a width "W", and a height "H" of particle-containment shield 700.

FIG. 24 shows a top view of particle-containment shield 700. The width (and height) of air inlet 702 is configured to connect to an outlet of cooling channel 118 (see FIG. 2) so that air may easily flow to particle-containment shield 700 with little resistance. Air outlet 704 may be larger than air inlet 702 to facilitate increased air flow through particle-containment shield 700. The increased size of air outlet 704 may increase the dimensions of particle-containment shield 700 so that particle-containment shield 700 has an increased capacity to collect and retain lamp particles upon lamp rupture.

Figure 30:
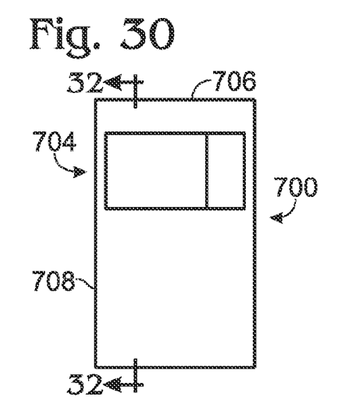

FIG. 30 shows a front view of particle-containment shield 700. An exterior wall 708 spans a majority of the height of containment structure 706 to define a lower edge of air outlet 702. Air outlet 702 spans substantially the entire width of containment structure 706.

Figure 31:
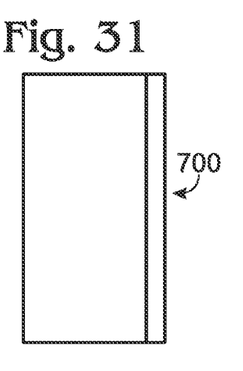
Figure 32:
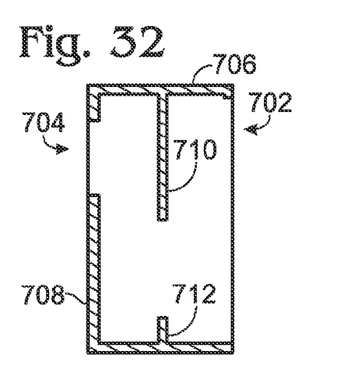

FIG. 31 shows a right-side view of particle-containment shield 700. Particle-containment shield 700 has a substantially rectangular profile. FIG. 32 shows a cross-section view of particle-containment shield 700 made along line "32-32" of FIG. 30. Particle-containment shield 700 includes a plurality of deflection members that collectively form a height-aligned configuration. In particular, upper-interior wall 710 extends from an interior ceiling surface of containment structure 706 downward beyond the lower edge of air outlet 704 to prevent any lamp particles from traveling directly from air inlet 702 to air outlet 704. Upper-interior wall 710 is perpendicular relative to the interior ceiling surface of containment structure 706. Lower-interior wall 712 extends from an interior floor surface of containment structure 706 to oppose upper-interior wall 710. Lower-interior wall 712 is oriented perpendicular relative to the interior floor surface. Upper-interior wall 710 and lower-interior wall 712 cooperatively create a narrow region in the lower portion of containment structure 706 and may deflect the lamp particles to reduce the exiting force of the lamp particles. The position of the narrow region created by the opposing interior walls may direct lamp particles to the interior corner formed at the base of exterior wall 708. Further, lower-interior wall 712 may act as a stop to collect lamp particles in the interior corner.

It will be appreciated that at least one of the deflection members may span substantially the entire interior width of containment structure 706. In some cases, all of the deflection members may span substantially the entire interior width of containment structure 706. Further, it will be appreciated that, in some cases, the walls of the containment structure may be characterized as deflection members.

Figure 33:
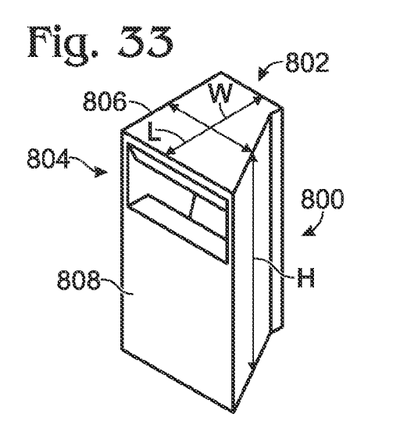
FIGS. 33, 34, 35, 36, and 37 respectively depict front-perspective, top, front, right-side, and cross-sectional views of a deflector particle-containment shield for use with the projection lamp module of FIG. 2.

FIGS. 33-37 show schematic representations of another example embodiment of a particle-containment shield 800. Particle-containment shield 800 includes a plurality of deflection members that collectively form a deflection configuration. FIG. 33 shows a front perspective view of particle-containment shield 800. Particle-containment shield 800 includes an air inlet 802 and an air outlet 804 which are defined by a containment structure 806 intermediate air inlet 802 and air outlet 804. Containment structure 806 contains air that passes through air inlet 802 so that it travels to air outlet 804. In other words, containment structure 806 is "air-tight" between air inlet 802 and air outlet 804. Containment structure 806 defines a length "L", a width "W", and a height "H" of particle-containment shield 800.

Figure 34:
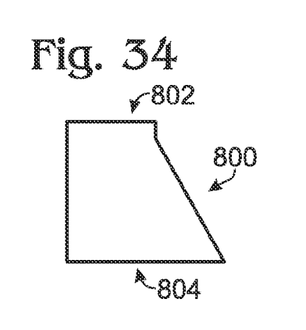

FIG. 34 shows a top view of particle-containment shield 800. The width (and height) of air inlet 802 is configured to connect to an outlet of cooling channel 118 (see FIG. 2) so that air may easily flows to particle-containment shield 800 with little resistance. Air outlet 804 is larger than air inlet 802 to facilitate increased air flow through particle-containment shield 800. The increased size of air outlet 804 increases the dimensions of particle-containment shield 800 so that particle-containment shield 800 has an increased capacity to collect and retain lamp particles upon lamp rupture.

Figure 35:
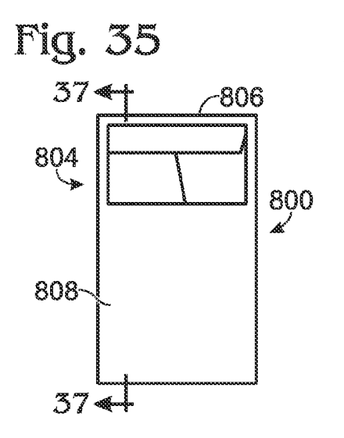

FIG. 35 shows a front view of particle-containment shield 800. An exterior wall 808 spans a majority of the height of containment structure 806 to define a lower edge of air outlet 802. Air outlet 802 spans substantially the entire width of containment structure 806.

Figure 36:
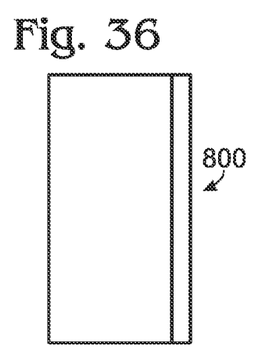
Figure 37:
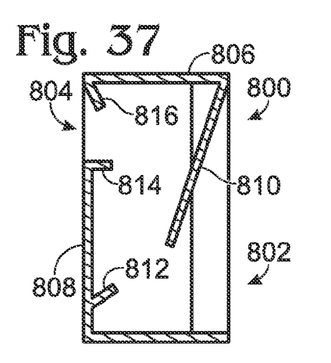

FIG. 36 shows a right-side view of particle-containment shield 800. Particle-containment shield 800 has a substantially rectangular profile. FIG. 37 shows a cross-section view of particle-containment shield 800 made along line "37-37" of FIG. 35. Particle-containment shield 800 includes a plurality of deflection members that collectively form a deflection configuration. In particular, upper-interior wall 810 extends from an interior ceiling surface of containment structure 806 downward beyond the lower edge of air outlet 804 to prevent any lamp particles from traveling directly from air inlet 802 to air outlet 804. Upper-interior wall 810 is oblique relative to the interior ceiling surface of containment structure 806. Lower-interior wall 812 extends from an interior floor surface of exterior wall 808 upward in the direction of air inlet 802 to oppose upper-interior wall 810. Lower-interior wall 812 is oriented oblique relative to the interior surface of exterior wall 808. Upper-interior wall 810 and lower-interior wall 812 cooperatively create a narrow region in the lower portion of containment structure 806 and may deflect lamp particles to reduce the exiting force of the lamp particles. The position of the narrow region created by the opposing interior walls may direct lamp particles to the interior corner formed at the base of lower-interior wall 812.

Lower-exterior ridge 814 extends from the interior surface of exterior wall 808 inward toward air inlet 802 Lower-exterior ridge 814 forms the lower edge of air outlet 804. Lower-exterior ridge 814 is perpendicular relative to exterior wall 808. Upper-exterior ridge 816 extends from the interior-ceiling surface of containment structure 806 inward toward air inlet 802. Upper-exterior ridge 816 forms the upper edge of air outlet 804. Upper-exterior ridge 816 is oblique relative to the interior-ceiling surface of containment device 806. Lower-exterior ridge 814 and upper-exterior ridge 816 cooperative deflect lamp particles attempting to exit air outlet 804 back toward the interior-floor surface of containment structure 806 in order to inhibit the lamp particles from exiting particle-containment shield 800.

It will be appreciated that at least one of the deflection members may span substantially the entire interior width of containment structure 806. In some cases, all of the deflection members may span substantially the entire interior width of containment structure 806. Further, it will be appreciated that, in some cases, the walls of the containment structure may be characterized as deflection members.

Figures 38, 39, 40, 41, 42:
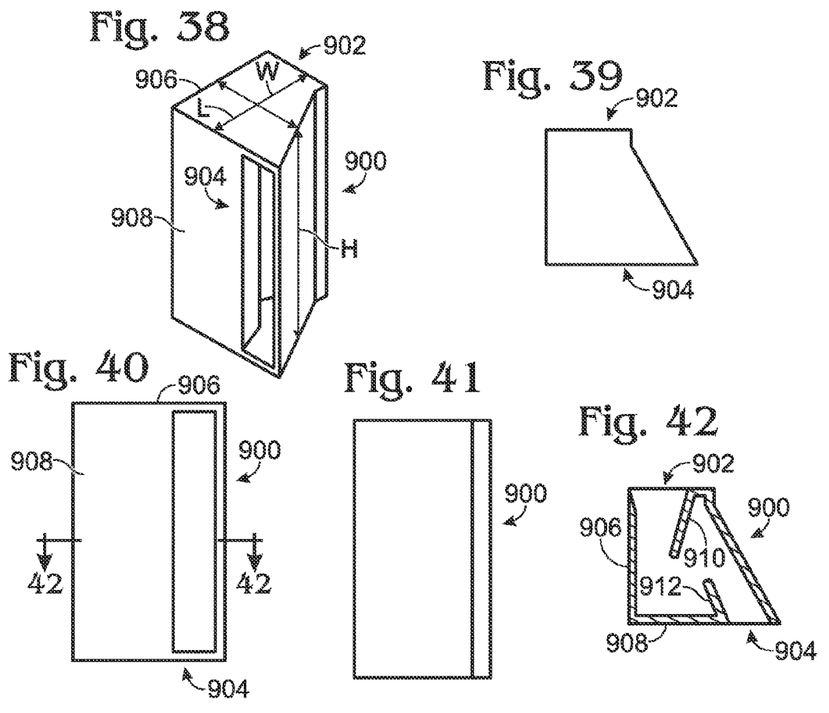
FIGS. 38, 39, 40, 41, and 42 respectively depict front-perspective, top, front, right-side, and cross-sectional views of a length-aligned serpentine air-flow path particle-containment shield for use with the projection lamp module of FIG. 2.

FIGS. 38-42 show schematic representations of another example embodiment of a particle-containment shield 900. Particle-containment shield 900 includes a plurality of deflection members that collectively form a length-aligned serpentine air-flow path configuration. FIG. 38 shows a front perspective view of particle-containment shield 900. Particle-containment shield 900 includes an air inlet 902 and an air outlet 904 which are defined by a containment structure 906 intermediate air inlet 902 and air outlet 904. Containment structure 906 contains air that passes through air inlet 902 so that it travels to air outlet 904. In other words, containment structure 906 is "air-tight" between air inlet 902 and air outlet 904. Containment structure 906 defines a length "L", a width "W", and a height "H" of particle-containment shield 900.

FIG. 39 shows a top view of particle-containment shield 900. The width (and height) of air inlet 902 is configured to connect to an outlet of cooling channel 118 (see FIG. 2) so that air may easily flow to particle-containment shield 900 with little resistance. Collectively, air outlet 904 and exterior wall 908 are larger than air inlet 902 to facilitate increased air flow through particle-containment shield 900. The increased size of air outlet 904 and exterior wall 908 increases the dimensions of particle-containment shield 900 so that particle-containment shield 900 has an increased capacity to collect and retain lamp particles upon lamp rupture.

FIG. 40 shows a front view of particle-containment shield 900. An exterior wall 908 spans substantially the entire height of containment structure 906 and a majority of the width of containment structure 906 to define a left-side edge of air outlet 904. Air outlet 904 spans substantially the entire height of containment structure 906.

FIG. 41 shows a right-side view of particle-containment shield 900. Particle-containment shield 900 has a substantially rectangular profile. FIG. 42 shows a cross-section view of particle-containment shield 900 made along line "42-42" of FIG. 40. Particle-containment shield 900 includes a plurality of deflection members that collectively form a length-aligned serpentine air-flow path configuration. In particular, interior wall 910 extends from an interior right-side surface of containment structure 906 toward exterior wall 908. Interior wall 910 extends obliquely to the left-side interior surface of containment structure 906 beyond the left-side edge of air outlet 904 to prevent any lamp particles from traveling directly from air inlet 902 to air outlet 904. Exterior ridge 912 extends from the interior surface of exterior wall 908 inward toward interior wall 910. Exterior ridge 912 forms the left-side edge of air outlet 904. Exterior ridge 912 is oblique relative to exterior wall 908. Interior wall 910 and exterior ridge 912 cooperatively form a serpentine path aligned with the length of containment structure 906. Lamp particles traveling down the serpentine path are forced to move forward to a corner created by the interior surface of exterior wall 908 then backward and around exterior ridge 912 in order to exit particle-containment shield 900. By forcing lamp particles to change directions multiple times within the interior of containment structure 906, the exit force of the lamp particle may be repeatedly reduced. Further, exterior ridge 912 is oriented at an angle that facilitates the buildup of lamp particles in the corner of the interior surface of exterior wall 908 in order to inhibit the lamp particles from exiting particle-containment shield 900.

It will be appreciated that at least one of the deflection members may span substantially the entire interior height of containment structure 906. In some cases, all of the deflection members may span substantially the entire interior height of containment structure 906. Further, it will be appreciated that, in some cases, the walls of the containment structure may be characterized as deflection members.

Figure 43:
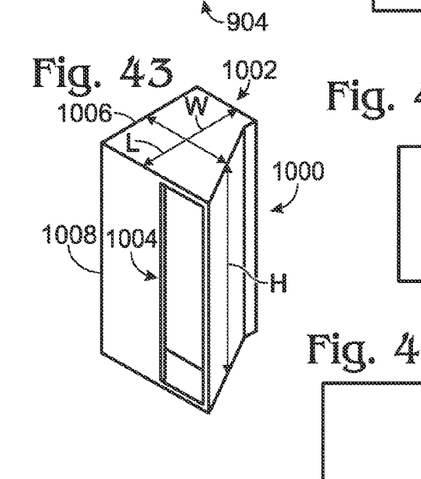

FIGS. 43-47 show schematic representations of another example embodiment of a particle-containment shield 1000. Particle-containment shield 1000 includes a plurality of deflection members that collectively form a width-aligned serpentine air-flow path configuration. FIG. 43 shows a front perspective view of particle-containment shield 1000. Particle-containment shield 1000 includes an air inlet 1002 and an air outlet 1004 which are defined by a containment structure 1006 intermediate air inlet 1002 and air outlet 1004. Containment structure 1006 may contain air that passes through air inlet 1002 so that it travels to air outlet 1004. In other words, containment structure 1006 may be "air-tight" between air inlet 1002 and air outlet 1004. Containment structure 1006 may define a length "L", a width "W", and a height "H" of particle-containment shield 1000.

FIG. 44 shows a top view of particle-containment shield 1000. The width (and height) of air inlet 1002 may be configured to connect to an outlet of cooling channel 118 (see FIG. 2) so that air may easily flow to particle-containment shield 1000 with little resistance. Collectively, air outlet 1004 and exterior wall 1008 are larger than air inlet 1002 to facilitate increased air flow through particle-containment shield 1000. The increased dimensions of particle-containment shield 1000 increase the capacity to collect and retain lamp particles upon lamp rupture.

FIG. 45 shows a front view of particle-containment shield 1000. An exterior wall 1008 spans substantially the entire height of containment structure 1006 and a majority of the width of containment structure 1006 to define a left-side edge of air outlet 1004. Air outlet 1004 spans substantially the entire height of containment structure 1006.

FIG. 46 shows a right-side view of particle-containment shield 1000. Particle-containment shield 1000 has a substantially rectangular profile. FIG. 47 shows a cross-section view of particle-containment shield 900 made along line "47-47" of FIG. 45. Particle-containment shield 1000 includes a plurality of deflection members that collectively form a width-aligned serpentine air-flow path configuration. In particular, interior wall 1010 extends from an interior right-side surface of containment structure 1006 toward an interior left-side surface of containment structure 1006 to direct lamp particles to the left-side of air inlet 1002. Interior wall 1010 is perpendicular relative to the right-side interior surface of containment structure 1006.

Left-side intermediate wall 1012 extends from the interior left-side surface of containment structure 1006 toward the interior left-side surface of containment structure 1006 beyond the right-side edge of air inlet 1002 to prevent incoming lamp particle from traveling directly to air outlet 1004. Left-side intermediate wall 1010 is perpendicular relative to the left-side interior surface of containment structure 1006. Left-side intermediate wall 1012 may deflect lamp particles entering through air inlet 1002 to reduce the exit force of the lamp particles and may direct the lamp particles to a right-side corner of the serpentine air-flow path.

Right-side intermediate wall 1014 extends from the interior right-side surface of containment structure 1006 toward the interior left-side surface of containment structure 1006 beyond the right-side edge of left-side intermediate wall 1012 to prevent lamp particles from traveling directly to air outlet 1004. Right-side Intermediate wall 1014 is perpendicular relative to the right-side interior surface of containment structure 1006. Right-side intermediate wall 1014 may deflect lamp particles passing left-side intermediate wall 1012 to further reduce the exit force of the lamp particles and may direct the lamp particles to a left-side corner of the serpentine path.

Exterior wall 1008 extends from the left-side of containment structure 1006 beyond the left-side edge of right-side intermediate wall 1014 to prevent lamp particles passing right-side intermediate wall 1014 from traveling directly out of air outlet 1004.

Interior wall 1010, left-side intermediate wall 1012, right-side intermediate wall 1014, and exterior wall 1008 cooperatively form a serpentine path aligned with the width of containment structure 1006. As used herein, the term "serpentine path" refers to the curved shape of an air flow path such as that in FIG. 47, which resembles the letter S, a sine wave, or a snake. In other words, as the air moves in the vertical direction in FIG. 47 from the inlet 1002 at the top of the Figure to the outlet 1004 at the bottom (along the "length" direction of FIG. 43), it must change direction at least twice in the horizontal, width direction. Lamp particles traveling down the serpentine path may be forced to move repeatedly to the left and to the right down the serpentine air-flow path in order to exit particle-containment shield 1000. By forcing the lamp particles to change direction multiple times via deflection within the interior of containment structure 1006, the exit force of the lamp particles is repeatedly reduced to inhibit the lamp particles from exiting particle-containment shield 1000.

It will be appreciated that at least one of the deflection members may span substantially the entire interior height of containment structure 1006. In some cases, all of the deflection members may span substantially the entire interior height of containment structure 1006. Further, it will be appreciated that, in some cases, the walls of the containment structure may be characterized as deflection members.

While various specific particle-containment shield arrangements are described above, it is to be understood that other arrangements are within the scope of the disclosure. For example, combinations of the above and/or repeating patterns of the above may be used. Other arrangements that block lamp particles by forming physical obstructions throughout an air channel may also be used.

In some embodiments, the particle-containment shield configurations may be combined with a mesh configuration in order to further improve the retention of projection lamp particles within the projection lamp module upon failure of the projection lamp. In some embodiments, the projection lamp may be coated and/or sealed in order to reduce the amount and/or dispersion rate of particles as a result of projection lamp failure.

Furthermore, the particle-containment shield may provide acoustic insulation that may reduce the operating noise level of the projection device and more particularly the blower. The acoustic insulation of the particle-containment shield may enable the blower to be operated at higher speeds without producing noise levels above suitable operating tolerances. Thus, if a specific particle-containment shield does slightly increase backpressure and/or reduce airflow, due to the improved acoustic dampening characteristics of the particle-containment shield, the blower may be operated at a higher operating voltage to decrease the operating pressure and increase the airflow. In this way, the retention of projection lamp particles within the projection lamp module may be improved upon failure of the projection lamp and the operating temperature of the projection lamp module may be regulated within a suitable range. Moreover, under some conditions the operating acoustics of the projection lamp module may be improved.

It will be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A particle-containment shield configured to be connected to an outlet of a projection lamp module of a projection device to inhibit projection lamp particles from exiting the projection device upon projection lamp rupture, comprising:
   a containment structure that defines an air inlet to receive air heated by a projection lamp from the outlet of the projection-lamp module and defines first and second air outlets to vent the air heated by the projection lamp away from the projection lamp, the containment structure being sealed intermediate the air inlet and the air outlets such that the air heated by the projection lamp that enters through the air inlet exits the containment structure through the air outlets the containment structure defining a length, a width, and a height of the particle-containment shield; and
   one or more deflection members arranged in the containment structure to collectively block all straight line paths from the air inlet to the air outlets so as to inhibit the projection lamp particles from exiting the air outlets upon the projection lamp rupture, wherein the one or more deflection members form a first serpentine air-flow path from the air inlet to the first air outlet and a second serpentine air-flow path from the air inlet to the second air outlet.

2. The particle-containment shield of claim 1, further comprising a plurality of third deflection members that extend an interior width of the containment structure, at least some of the third deflection members being chevron-shaped, positioned proximate to the air inlet, and being spaced apart along a height of the inlet, and at least some of the third deflection members being positioned proximate to the outlets each of the third deflection members being aligned with a height of the containment structure and being spaced apart along the length of the particle-containment shield.

3. The particle-containment shield of claim 1, wherein the serpentine air-flow paths are oriented such that corners of the serpentine air-flow paths are oriented along an interior width of the containment structure.

4. The particle-containment shield of claim 1, wherein the serpentine air-flow paths are oriented such that corners of the serpentine air-flow paths are oriented along an interior height of the containment structure.

5. The particle-containment shield of claim 1, wherein the serpentine air-flow paths are oriented such that corners of the serpentine air-flow paths are oriented along an interior length of the containment structure.

6. The particle-containment shield of claim 1, wherein an exterior wall of the containment structure that forms at least one edge of the air outlets extends at least a majority of a height of the containment structure.

7. The particle-containment shield of claim 6, wherein the air outlets spans substantially an entire width of the exterior wall.

8. The particle-containment shield of claim 7, further comprising at least one second deflection member, which extends substantially an entire interior width of the containment structure.

9. The particle-containment shield of claim 8, wherein the second deflection member extends from an interior ceiling surface of the containment structure or an interior floor surface of the containment structure at least to an opposing floor or ceiling edge of the air outlets.

10. The particle-containment shield of claim 9, wherein the second deflection member is perpendicular relative to the interior ceiling surface or the interior floor surface.

11. The particle-containment shield of claim 9, wherein the second deflection member is oblique relative to the interior ceiling surface or the interior floor surface.

12. The particle-containment shield of claim 6, wherein the exterior wall forming at least one edge of the air outlets includes a section that protrudes into the containment structure in a direction of the air inlet.

13. The particle-containment shield of claim 12, wherein the section of the exterior wall that protrudes into the containment structure forms a rounded scoop.

14. The particle-containment shield of claim 6, wherein the air outlets extend substantially an entire height of the containment structure.

15. The particle-containment shield of claim 14, further comprising at least one fourth deflection member, which extends substantially an entire interior height of the containment structure.

16. The particle-containment shield of claim 6, further comprising at least one sixth, chevron-shaped deflection member having two angled segments that meet at a point, and the sixth deflection member being oriented such that the point points to the air inlet or the air outlets, and the two angled segments collectively spanning at least as wide as edges of the air inlet or the air outlets.

17. A projection lamp module comprising: a lamp to generate light for projection of an image; a blower to circulate air heated by operation of the lamp; a cooling channel configured to receive the air circulated by the blower and direct the air to an outlet positioned away from the lamp to dissipate heat away from the lamp; and a particle-containment shield configured to be connected to the outlet of the cooling channel to inhibit projection lamp particles from exiting the projection lamp module upon projection lamp rupture, including:

a containment structure that defines an air inlet to receive air heated by a projection lamp from the outlet of the projection-lamp module and defines first and second air outlets to vent the air heated by the projection lamp away from the projection lamp, the containment structure being sealed intermediate the air inlet and the air outlets such that the air heated by the projection lamp that enters through the air inlet exits the containment structure through the air outlets the containment structure defining a length, a width, and a height of the particle-containment shield;

a plurality of deflection members arranged in the containment structure to collectively block all straight line paths from the air inlet to the air outlets so as to inhibit the projection lamp particles from exiting the air outlets upon the projection lamp rupture, wherein the deflection members form a first serpentine air-flow path from the air inlet to the first air outlet and a second serpentine air-flow path from the air inlet to the second air outlet.

18. A projection device to project an image to a remote projection screen comprising:

a projection lamp module including:

a lamp to generate light for projection of an image;

a blower to circulate air heated by operation of the lamp;

a cooling channel configured to receive the air circulated by the blower and direct the air to an outlet positioned away from the lamp to dissipate heat away from the lamp; and a particle-containment shield configured to be connected to the outlet of the cooling channel to inhibit projection lamp particles from exiting the projection device upon projection lamp rupture, including:

a containment structure that defines an air inlet to receive air heated by a projection lamp from the outlet of the projection-lamp module and defines first and second air outlets to vent the air heated by the projection lamp away from the projection lamp, the containment structure being sealed intermediate the air inlet and the air outlets such that the air heated by the projection lamp that enters through the air inlet exits the containment structure through the air outlets the containment structure defining a length, a width, and a height of the particle-containment shield; and one or more deflection members arranged in the containment structure to collectively block all straight line paths from the air inlet to the air outlets so as to inhibit the projection lamp particles from exiting the air outlets upon the projection lamp rupture, wherein the one or more deflection members form a first serpentine air-flow path from the air inlet to the first air outlet and a second serpentine air-flow path from the air inlet to the second air outlet: and an imaging system configured to receive light generated by the projection lamp module, the imaging system configured to utilize the light to generate a rendered image to be projected from the projection device.

* * * * *